United States Patent
Komatsuzawa et al.

(10) Patent No.: US 6,508,870 B1
(45) Date of Patent: Jan. 21, 2003

(54) INK FOR PLATE PEN

(75) Inventors: Tadashi Komatsuzawa, Kanagawa (JP); Hiroshi Kiyomoto, Kanagawa (JP)

(73) Assignee: Kabushiki Kaisha Pilot, Tokyo (JP)

( * ) Notice: Subject to any disclaimer, the term of this patent is extended or adjusted under 35 U.S.C. 154(b) by 95 days.

(21) Appl. No.: 09/642,102

(22) Filed: Aug. 21, 2000

(30) Foreign Application Priority Data

Aug. 25, 1999 (JP) .......................................... 11-277288

(51) Int. Cl.$^7$ .............................................. C09D 11/06
(52) U.S. Cl. ................ 106/31.27; 106/31.6; 106/31.58; 106/31.86
(58) Field of Search ........................... 106/31.58, 31.86, 106/31.27, 31.6

(56) References Cited

U.S. PATENT DOCUMENTS

| | | | | |
|---|---|---|---|---|
| 4,388,115 A | * | 6/1983 | Sugiyama et al. | 106/31.36 |
| 4,500,355 A | * | 2/1985 | Shimada et al. | 106/31.5 |
| 4,793,860 A | * | 12/1988 | Murakami et al. | 106/31.43 |
| 5,205,862 A | * | 4/1993 | Kiyomoto et al. | 106/31.43 |
| 5,702,510 A | * | 12/1997 | Yoshida et al. | 106/31.6 |
| 5,746,818 A | * | 5/1998 | Yatake | 106/31.28 |
| 5,775,828 A | | 7/1998 | Ikeda | |
| 5,877,235 A | | 3/1999 | Sakuma et al. | |
| 6,048,914 A | | 4/2000 | Goto et al. | |

FOREIGN PATENT DOCUMENTS

| | | |
|---|---|---|
| DE | 198 31 236 | 1/1999 |
| EP | 0 425 280 | 5/1991 |

\* cited by examiner

*Primary Examiner*—Helene Klemanski
*Assistant Examiner*—Veronica F. Faison
(74) *Attorney, Agent, or Firm*—Rader, Fishman & Grauer PLLC

(57) ABSTRACT

The ink allows to prevent spout of the ink from the nib, and has a good penetrating and drying ability of writing to a material to be written. And the ink comprises a penetrant and a coloring agent, a humectant and water, wherein viscosity at 20° C. is from 1.2 to 10 mPa·s and surface tension is from 35 to 55 dyne/cm. The penetrant can be glycol ether represented by the following formula $$R_1-(O-R_2)_x-O-R_3$$

wherein, $R_1$ is an alkyl group having 2 to 4 carbon atoms or a phenyl group, $R_2$ is "—$CH_2$—$CH_2$—" or "—$CH_2CH(CH_3)$—", $R_3$ is H or an alkyl group having 1 to 6 carbon atoms, and X is an integer of 2 or 3.

13 Claims, No Drawings

INK FOR PLATE PEN

TECHNICAL FIELD OF THE INVENTION

The present invention relates to an ink for a plate pen produces by a method comprising:

stacking plurality of thin plates to form a capillary space between the plates, and providing, for a penholder, a plate-type pen body in which said capillary space is used as an ink path.

BACKGROUND OF THE INVENTION

As said plate pen, a writing tool disclosed in Japanese Patent Publication Laid-Open No. 52976/1996 is known. The plate pen can provide ink steadily and allows selecting a wide variety of writing width and changing a writing angle freely, so that it is very excellent as calligraphy pen. However, this is a function only in monochrome. If the sue of gradation function is attempted in multicolor, it is a sole means to contact a syringe or a pen body of the other writing tool with a paper-touching part of the point of the (plate) pen body to supply ink of a different color. In this method, however, it is difficult to regulate a required quantity of each ink color, and therefore the effect of the multicolor writing is insufficient and the method lacks freedom of gradation.

An ink for this-plate pen is particularly not known.

SUMMARY OF THE INVENTION

A plate pen is formed by preliminarily stacking a plurality of thin plates, and providing a capillary space between plates. A pen body utilizes the capillary space as an ink passage. Accordingly, the amount of ink used is about ten to twenty times as much as that of the conventional fountain pen, and thus it consumes an extremely large amount of ink. For this reason, particular performance is required for the ink.

For example, it is necessary to prevent the ink from spouting from the nib. Good penetrating characteristics and drying ability of ink that is written into a material to be written, and the like are also requisite features. The present invention provides an ink for a plate pen wherein such requirements are met.

The present invention relates to the following:

1. An ink for a plate pen comprising a penetrant and a coloring agent, a humectant and water; wherein viscosity at 20° C. is from 1.2 to 10 mPa·s and surface tension is from 35 to 55 dyne/cm.

2. The ink for a plate pen according to the paragraph 1, wherein the penetrant is composed of a glycol ether represented by the following formula:

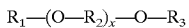   Formula (I)

wherein, $R_1$ is an alkyl group having 2 to 4 carbon atoms or phenyl group, $R_2$ is "—$CH_2$—$CH_2$—" or "—$CH_2CH(CH_3)$—", $R_3$ is H or an alkyl group having 1 to 6 carbon atoms, and X is an integer of 2 or 3.

3. The ink for a plate pen according to the paragraph 1, wherein the penetrant is 3-methyl-3-methoxybutanol.

4. The ink for a plate pen according to the paragraph 1, wherein the penetrant is a glycol ether having a vapor pressure of 0.01 to 0.5 mmHg, a boiling point of 150 to 280° C., a surface tension of 25 to 35 dyne/cm, and a viscosity of 1.2 to 10 mPa·s at 20° C. and 760 mmHg.

5. The ink for a plate pen according to any of the paragraphs 1 to 4, wherein the coloring agent is present in the ink in an amount of 5 to 15% by weight.

6. The ink for a plate pen according to any of the paragraphs 1 to 5, wherein blending a amount of the penetrant is from 0.5 to 3.0% by weight.

7. The ink for a plate pen according to any of the paragraphs 1 to 6, wherein the pH of the ink is from 8 to 11."

PREFERRED EMBODIMENTS OF THE INVENTION

The ink of the present invention is supplied to the point of a pen through capillary space formed at gaps between thin plates stacked in a plate-type pen body. When the viscosity of the ink exceeds 10 mPa·s, the supply of ink to the nip becomes insufficient and continuity of writing is lost, and thus the so-called "insufficient following" occurs. When viscosity of the ink is 1.2 mPa·s or less, it becomes difficult to constitute an ink possessing characteristics of attainment of dry-up resistance and high density writing.

Accordingly, viscosity of the ink is necessarily from 1.2 mPa·s to 10 mPa·s.

Furthermore, even when viscosity of the ink is from 1.2 mPa·s to 10 mPa·s, the ink may spout out of the nib and also blotting of writing may occur if the surface tension of the ink is 35 dyne/cm or less. In the case of 55 dyne/cm or more, the ink in an ink reservoir is not replaced with air, which results in insufficient ink-flow.

Consequently, the ink for a plate pen optimally has a viscosity of 1.2 mPa·s to 10 mPa·s and a surface tension of 35 dyne/cm to 55 dyne/cm.

In the present invention, a specific penetrant is used.

A plate pen where the ink of the present invention is to be used is a writing tool consuming a large amount of ink, which has an ink-flowing rate of ten to twenty times larger than the conventional writing tool. Therefore, poor drying ability on the paper to which a large amount of writing is performed has been a problem.

Since paper is a porous body composed of highly hydrophilic cellulose molecules, it is prone to absorb ink and thus is, without further treatment, in a condition that blotting will easily occur (extremely prone to get wet).

Paper used for writing is usually subjected to a sizing (making paper hydrophobic) treatment in order to prevent blotting of ink and adjust absorption of ink. Sizing is carried out to fill gaps and chinks on the surface and inside of paper with a sizing agent (an agent for making paper hydrophobic), so that wettability with ink is adjusted (making paper less wettable) and occurrence of blotting, strike through, etc. is avoided.

Consequently, when writing with an aqueous ink on a sized paper, there usually exists "a wetting time" until penetration of ink starts, i.e., a phenomenon that a certain time is needed until ink begins to penetrate into the paper. As a result, penetration of ink requires much time. Especially, since a plate pen where the ink of the present invention is used is such a type of pen consuming a large amount of ink, penetrating ability of ink has been a problem.

In the present invention, a specific penetrant is used in order to improve penetrating ability. The penetrant used in the present invention is a glycol ether represented by the following formula (I) and/or 3-methyl-3-methoxybutanol, and the use thereof increases drying ability of written ink and enhances penetrating ability to prevent unclearness of writing through its blotting.

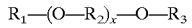   Formula (I)

The effects of the penetrant used in the present invention will be explained.

Paper is a porous structure and can be considered as an assembly of many capillaries. In general, depth of penetration of ink into paper (h) is shown according to the Lucas-Washburn equation represented by the following.

$$h = \sqrt{\frac{\gamma r t \cos\theta}{2\eta}}$$

h: depth of penetration of ink
γ: surface tension of ink
r: radius of capillary of paper
θ: contact angle between ink and paper
η: viscosity of ink
t: time for penetration of ink From the equation, time for penetration of ink (t) is deduced as follows:

$$t = \left(\frac{\eta}{\gamma\cos\theta}\right) \cdot \frac{2}{r} \cdot h^2$$

Accordingly, in order to shorten the time for penetration, it would be effective to design an ink wherein viscosity of the ink is lowered, the surface tension is increased, and the contact angle with a paper is decreased.

In the present invention, attention is focused to particularly decreasing the contact angle with a paper. That is, addition of the above-mentioned penetrant to ink enhances wettability with a sized paper, whereby the resulting ink is penetrated quickly in the vertical direction prior to occurrence of inhomogeneous blotting on paper surface. Thereby, even if writing is conducted with a plate pen which consumes a large amount of ink, the written ink has a good drying ability on a paper and does not cause deterioration of writing such as blotting. The scientific reason why the good results are obtained by the use of the penetrant represented by the above equation is not clear, but it is considered that a good matching of a sizing agent used for a writing paper with wettability of the penetrant of the present invention would result in the good penetrating effect.

Next, the ink of the present invention will be explained concretely.

The following are used as the penetrant.

Examples of the glycol ethers belonging to the formula (I) are as follows:

glycol ethers such as diethylene glycol monobutyl ether, triethylene glycol monobutyl ether, and diethylene diglycol, and they may be used alone or in combination with two or more of them.

Other than these, 3-methyl-3-methoxybutanol is also preferred.

The amount of the penetrant to be used is preferably from 0.5 to 3.0%.

As the humectant, the following are used.

Polyhydric alcohols such as ethylene glycol, diethylene glycol, triethylene glycol, propylene glycol, butylene glycol, 1,3-butylene glycol, hexylene glycol, glycerol, polyethylene glycol; and urea and the like may be used alone or in combination with two or more of them. The amount to be used is preferably from 2 to 30%.

Dyes and pigments are used as the coloring agent.

A larger amount of the coloring agent is required for the ink for a plate pen as compared with the ink for a ballpoint pen. The coloring agent is preferably present in the ink in an amount of 5 to 15% by weight.

Dense and clear writing is required for the writing with a plate pen and therefore the amount of coloring agent becomes large. In the case of less than 5% by weight, the writing becomes pale, and the stability during storage lowered in the case of more than 15% by weight. Therefore, both cases are not preferred.

However, because a pale color tone is also desired recently, the ink containing the coloring agent of 2.5% by weight to 5% by weight is also included in the present invention.

Acid dyes
Acid Yellow 1, 3, 6, 7, 11, 17, 19, 23, 36, 40, 42, 49
Acid Orange 1, 7, 8, 10, 19, 28, 43, 51, 56, 63, 67
Acid Red 1, 6, 14, 18, 27, 32, 42, 51, 52, 73, 82, 87, 92, 94, 97, 114, 134, 249, 289
Acid Violet 7, 11, 15, 43, 49, 66
Acid Blue 1, 7, 9, 15, 22, 23, 40, 41, 45, 59, 62, 74, 78, 83, 90, 103, 217
Acid Green 3, 7, 9, 16, 19, 20, 25, 27, 36, 41, 44
Acid Brown 2, 4, 13, 14, 20, 27
Acid Black 1, 2, 7, 24, 26, 31, 48, 52, 94
Direct dyes
Direct Yellow 12, 44, 132
Direct Orange 49
Direct Red 39, 4, 9, 23, 4, 9, 23, 31, 227
Direct Blue 6, 1, 15, 86, 87, 199
Direct Black 17, 19, 32, 38, 51, 74, 154
Food Colors
Food Black 2
Food Yellow 3
Organic Pigments
C.I. Pigment Yellow 1, 2, 3, 5, 12, 13, 14, 15, 83
C.I. Pigment Orange 1, 5, 13, 16, 17, 24
C.I. Pigment Red 1, 2, 3, 4, 5, 7, 9, 12, 22, 23, 37, 38, 48, 50, 51, 63, 81, 83, 88, 112, 214
C.I. Pigment Violet 1, 2, 3, 23
C.I. Pigment Blue 1, 2, 15, 16, 17
C.I. Pigment Green 2, 7, 8, 10
C.I. Pigment Brown 1, 2, 5
C.I. Pigment Black 1, 7

Other than the above, fluorescent dyes, fluorescent pigments, and processed pigments are also usable.

Both the dyes and pigments can be used alone or in combination with two or more of them.

When acid dyes and direct dyes are used for the ink, a pH of 8 to 11 is preferable owing to enhanced solubility of dyes in the ink.

Because papers currently used are acid papers and therefore the writing with ink changes its color with the passage of time, it is effective for preservation of the writing to make the ink alkaline of pH 8 to 11.

Other than the above, a rust preventive and a preservative may be optionally used.

Examples

Next, the present invention is concretely explained with reference to the examples.

Example 1

| | |
|---|---|
| Ethylene glycol | 9.0% by weight |
| Urea | 5.0% by weight |

-continued

| | |
|---|---|
| 1,2-Benzothiazoline-3-one | 0.2% by weight |
| 3-Methyl-3-methoxybutanol | 2.0% by weight |
| Triethanolamine | 1.0% by weight |
| Benzotriazole | 0.2% by weight |
| C.I. Acid Blue 90 | 7.0% by weight |
| Ion exchange water | remainder | were mixed to form an ink.

The performance was shown in Table 2.

Examples 2 to 6

Inks were formed in a similar manner to Example 1 with

TABLE 2

| | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| (A) PH | 8.5 | 8.7 | 8.8 | 8.7 | 8.8 | 9.0 | 8.6 | 8.6 | 8.4 | 8.8 |
| Viscosity(20° C.) mPa · S | 2.2 | 2.4 | 4.9 | 10.0 | 2.1 | 1.9 | 14.6 | 34.0 | 2.3 | 1.7 |
| Surface Tension (dyne/cm) | 47.0 | 53.0 | 51.2 | 51.0 | 51.1 | 55.0 | 51.2 | 51.5 | 29.0 | 60.1 |
| (B) Ink Flowability | ○ | ○ | ○ | ○ | ○ | ○ | X | X | ○ | X |
| Blotting | ○ | ○ | ○ | ○ | ○ | ○ | ○ | ○ | X | ○ |
| Penetrating Ability | ○ | ○ | ○ | ○ | ○ | ○ | ○ | Δ | ○ | X |
| Hanging | ○ | ○ | ○ | ○ | ○ | ○ | ○ | ○ | X | ○ |

(Note)
(A): Physical properties.
(B): Evaluation
○: Good and acceptable.
Δ: Fair and acceptable.
X: Bad and not acceptable.

As apparent in the above, when surface tension is lower than the lower limit of 35 to 55 dyne/cm, blotting or hanging tend to occur, even if viscosity of the ink for a plate pen is in the range of 1.2 to 10 mPa·s. On the other hand, its viscosity and/or surface tension exceed(s) each upper limit, following ability and penetrating ability can be deteriorated.

When applied to a plate pen where a large amount of ink is supplied to a material to be written, the present invention exhibits an excellent effects of forming a good writing with an excellent penetrating ability of ink without occurring problems of insufficient following at writing, blotting, or hanging of ink from nip.

The disclosure of Japanese Patent Application No. 11-227288 filed Aug. 25, 1999, including specification, drawings and claims are herein incorporated by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An ink for a plate pen comprising a penetrant at a blending amount from 0.5 to 3.0% by weight, and a coloring agent, a humectant and water, wherein viscosity at 20° C. is from 1.2 to 10 mPa·S and surface tension is from 35 to 55 dyne/cm.

2. The ink for a plate pen according to claim 1, wherein the penetrant is composed of a glycol ether represented by the following formula (I):

$$R_1-(O-R_2)_x-O-R_3 \quad (I)$$

wherein, $R_1$ is an alkyl group having 2 to 4 carbon atoms or a phenyl group, $R_2$ is "—$CH_2$—$CH_2$—" or "—$CH_2CH(CH_3)$—", $R_3$ is H or an alkyl group having 1 to 6 carbon atoms, and X is an integer of 2 or 3.

3. The ink for a plate pen according to claim 1, wherein the penetrant is 3-methyl-3-methoxybutanol.

4. The ink for a plate pen according to claim 1, wherein the penetrant is a glycol ether having a vapor pressure of 0.01 to 0.5 mmHg, a boiling point of 150 to 280° C., a surface tension of 25 to 35 dyne/cm, and a viscosity of 1.2 to 10 mPa·s at 20° C. and 760 mmHg.

5. The ink for a plate pen according claim 1, wherein the coloring agent is present in the ink in an amount of 5 to 15% by weight.

6. The ink for a plate pen according to claim 1, wherein a pH of the ink is from 8 to 11.

7. A plate pen having an ink therein, said ink comprising a penetrant and a coloring agent, a humectant and water, wherein viscosity at 20° C. is from 1.2 to 10 mPa·S and surface tension is from 35 to 55 dyne/cm.

8. The plate pen according to claimed 7, wherein the penetrant in said ink is composed of a glycol ether represented by the following formula (I):

$$R_1-(O-R_2)_x-O-R_3 \quad (I)$$

Wherein $R_1$ is an alkyl group having 2 to 4 carbon atoms or a phenyl group, $R_2$ is "—$CH_2$—$CH_2$—" or "—$CH_2CH(CH_3)$—", $R_3$ is H or an alkyl group having 1 to 6 carbon atoms, and X is an integer of 2 or 3.

9. The plate pen according to claim 8, wherein the penetrant in said ink is 3-methyl-3-methoxybutanol.

10. The plate pen according to claim 7, wherein the penetrant in said ink is a glycol ether having a vapor pressure of 0.01 to 0.5 mmHg, a boiling point of 150 to 280° C., a surface tension of 25 to 35 dyne/cm, and a viscosity of 1.2 to 10 mPa·S at 20° C. and 760 mmHg.

11. The plate pen according to claim 7, wherein the coloring agent is present in said ink in an amount of 5 to 15% by weight.

12. The plate pen according to claim 7, wherein a blending amount of the penetrant in said ink is from 0.5 to 3.0% by weight.

13. The plate pen according to claim 7, wherein a pH of said ink is from 8 to 11.

* * * * *